United States Patent
Begum et al.

(10) Patent No.: US 10,695,663 B2
(45) Date of Patent: Jun. 30, 2020

(54) AMBIENT AWARENESS IN VIRTUAL REALITY

(71) Applicant: Intel Corporation, Santa Clara, CA (US)

(72) Inventors: Shamim Begum, Beaverton, OR (US); Kofi C. Whitney, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 14/979,341

(22) Filed: Dec. 22, 2015

(65) Prior Publication Data
US 2017/0173454 A1 Jun. 22, 2017

(51) Int. Cl.

| | |
|---|---|
| A63F 13/215 | (2014.01) |
| G10L 25/51 | (2013.01) |
| G10L 25/72 | (2013.01) |
| G10L 15/20 | (2006.01) |
| A63F 13/217 | (2014.01) |
| A63F 13/5255 | (2014.01) |
| A63F 13/25 | (2014.01) |
| A63F 13/65 | (2014.01) |
| G06T 19/00 | (2011.01) |
| G10L 17/00 | (2013.01) |

(52) U.S. Cl.
CPC ......... *A63F 13/217* (2014.09); *A63F 13/215* (2014.09); *A63F 13/25* (2014.09); *A63F 13/5255* (2014.09); *A63F 13/65* (2014.09); *G06T 19/006* (2013.01); *G10L 25/51* (2013.01); *G10L 25/72* (2013.01); *A63F 2300/8082* (2013.01); *G10L 15/20* (2013.01); *G10L 17/00* (2013.01)

(58) Field of Classification Search
None
See application file for complete search history.

(56) References Cited

U.S. PATENT DOCUMENTS

| | | | | |
|---|---|---|---|---|
| 7,676,372 B1 * | 3/2010 | Oba | ...................... | G09B 21/009 |
| | | | | 434/169 |
| 8,425,322 B2 * | 4/2013 | Gillo | ....................... | A63F 13/31 |
| | | | | 463/42 |

(Continued)

FOREIGN PATENT DOCUMENTS

| | | |
|---|---|---|
| EP | 2661097 A2 | 11/2013 |
| WO | 2014143959 A2 | 9/2014 |

OTHER PUBLICATIONS

International Search Report and Written Opinion for International Patent Application No. PCT/US2016/063460, dated Feb. 22, 2017, 13 pages.

(Continued)

*Primary Examiner* — James S. McClellan
*Assistant Examiner* — Peter J Iannuzzi
(74) *Attorney, Agent, or Firm* — Jordan IP Law, LLC

(57) ABSTRACT

Systems, apparatus and methods may provide for audio processing of received user audio input from a microphone that may optionally be a tissue conducting microphone. Audio processing may be further conducted on received ambient audio from one or more additional microphones. A translator may translate the ambient audio into content to be output to a user. In an embodiment, ambient audio is translated into visual content to be displayed on a virtual reality device.

19 Claims, 3 Drawing Sheets

(56) References Cited

U.S. PATENT DOCUMENTS

| | | | | |
|---|---|---|---|---|
| 9,135,915 | B1* | 9/2015 | Johnson | G10L 15/26 |
| 2009/0264161 | A1* | 10/2009 | Usher | H04M 1/22 |
| | | | | 455/570 |
| 2009/0287640 | A1 | 11/2009 | Hamilton, II et al. | |
| 2011/0135106 | A1* | 6/2011 | Yehuday | H04R 1/1083 |
| | | | | 381/71.6 |
| 2013/0293723 | A1* | 11/2013 | Benson | G02B 27/017 |
| | | | | 348/164 |
| 2013/0308798 | A1 | 11/2013 | Lee | |
| 2014/0172426 | A1* | 6/2014 | Aratsu | G10L 21/0208 |
| | | | | 704/235 |
| 2014/0337023 | A1* | 11/2014 | McCulloch | G06F 1/163 |
| | | | | 704/235 |
| 2015/0090257 | A1 | 4/2015 | Larsen | |
| 2015/0195641 | A1* | 7/2015 | Di Censo | H04R 1/1083 |
| | | | | 381/71.6 |
| 2015/0382131 | A1* | 12/2015 | Kuehne | H04S 7/304 |
| | | | | 381/310 |
| 2016/0019891 | A1* | 1/2016 | Martinez | G10L 21/0216 |
| | | | | 704/275 |
| 2016/0105751 | A1* | 4/2016 | Zurbruegg | H04R 25/407 |
| | | | | 381/317 |
| 2017/0068508 | A1* | 3/2017 | Cricri | H04S 7/30 |
| 2017/0155993 | A1* | 6/2017 | Boesen | H04R 1/1016 |
| 2018/0260187 | A1* | 9/2018 | Yasuda | H04R 1/10 |

OTHER PUBLICATIONS

International Preliminary Report on Patentability for International Patent Application No. PCT/US2016/063460, dated Jul. 5, 2018, 10 Pages.

* cited by examiner

AMBIENT AWARENESS IN VIRTUAL REALITY

TECHNICAL FIELD

Embodiments generally relate to ambient awareness in a virtual reality environment. More particularly, embodiments relate to processing various received audio inputs into content.

BACKGROUND

Virtual reality experiences may fully immerse users in virtual worlds. Users may wear a virtual reality headset and microphones to achieve this immersion. There may be times, however, when it is desirable to be aware of situations occurring in the ambient environment surrounding the user. Such situations may include the ring of a doorbell or telephone or another individual trying to speak to the user.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
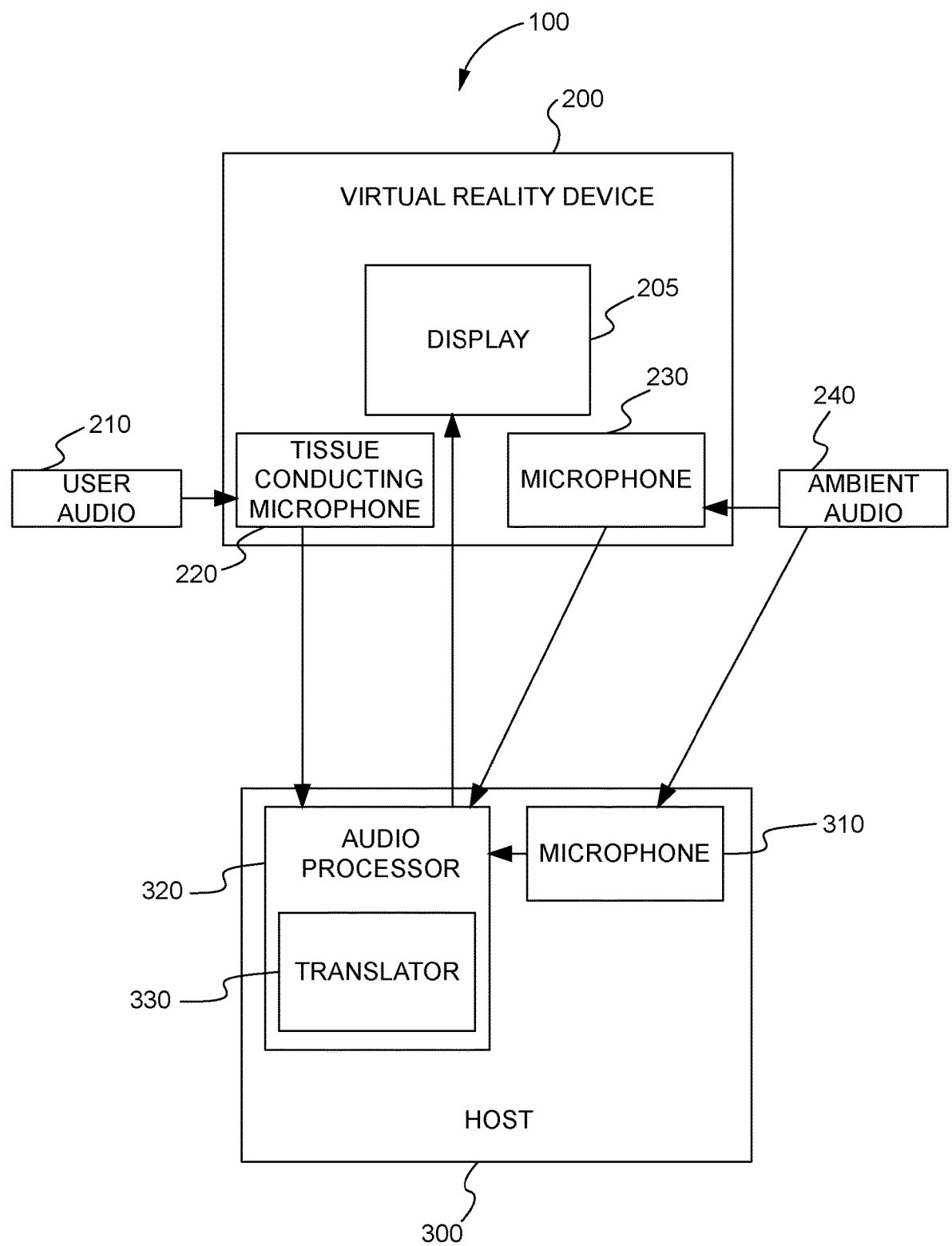
FIG. 1 is an illustration of an example of a system having a virtual reality device and a host according to an embodiment.

Turning now to FIG. 1, an environmental immersion system 100 is shown. The system 100 may generally relate to a virtual reality device 200 and a host device 300 (e.g., an ambient awareness apparatus). The virtual reality device 200 may be any type of device, such as, for example, a virtual reality headset with a display 205 that is wearable by a user, or any other device intended to provide a user with an immersion experience into a virtual world. The host device 300 may be any device that is capable of communicating with the virtual reality device 200 to provide content to a user. The host device 300 may be a computer of any kind, a tablet, a smart phone, a smart television, a game console, or any other device capable of providing the virtual reality content to the virtual reality device 200.

The virtual reality device 200 may include a tissue conducting microphone 220 to capture user audio 210 such as commands by the user that may be spoken in the context of a virtual reality environment. The tissue conducting microphone 220 may be positioned within the virtual reality device 200 so that it makes contact with a body part of the user. The user audio 210 is conducted to the illustrated microphone 220 through user tissue such as bone and soft tissues such as muscles and skin. In this manner, the user audio 210 may be separated from ambient audio 240 that would not be conducted to the tissue conducting microphone 220.

Optionally, the virtual reality device 200 may include one or more additional microphones 230 to capture the ambient audio 240. The additional microphones 230 may be used if the ambient audio 240 is to be processed by the host device 300, to be described in more detail below. The microphones 230 may use air as the conduction medium to carry the ambient audio 240, such as a ringing telephone or doorbell, a crying baby, and so forth. Any device capable of capturing the ambient audio 240 may be used as the microphone 230.

Alternatively, one or more microphones 310 may be positioned within the host device 300. As with the microphones 230, the illustrated microphones 310 capture the ambient audio 240. Although the microphones 230 or 310 may also inadvertently capture user audio 210, this audio may be removed from the ambient audio 240 as will be described in more detail below.

The tissue conducting microphone 220, the virtual reality device microphone 230, and/or the host microphone 310 may communicate with an audio processor 320. The audio processor 320 may use filtering or voice recognition techniques to remove the user audio 210 from the ambient audio 240. In one aspect, the user audio 210 may be compared to the ambient audio 240 to isolate the user audio 210 (e.g., the user's voice commands). Audio processing techniques may then recognize and ignore the user audio 210, leaving only the ambient audio 240 as content to be transmitted to the user. The audio processor 320 may be configured to recognize a variety of ambient sounds such as voices, alarms, ringtones, pet noises, doorbells, etc. Voice recognition techniques and/or system training may be used to automatically recognize the source of a variety of ambient sounds.

A translator 330 within the audio processor 320 may receive the ambient audio and convert it to content to be output to the virtual reality device 200. In one embodiment, the content may be visual content to be presented on a display 205 of the virtual reality device 200. Alternatively, as may be selected by the user, the content may be delivered as an audio notification or a haptic notification, or any combination of visual, audio, and haptic notifications.

Figure 2:
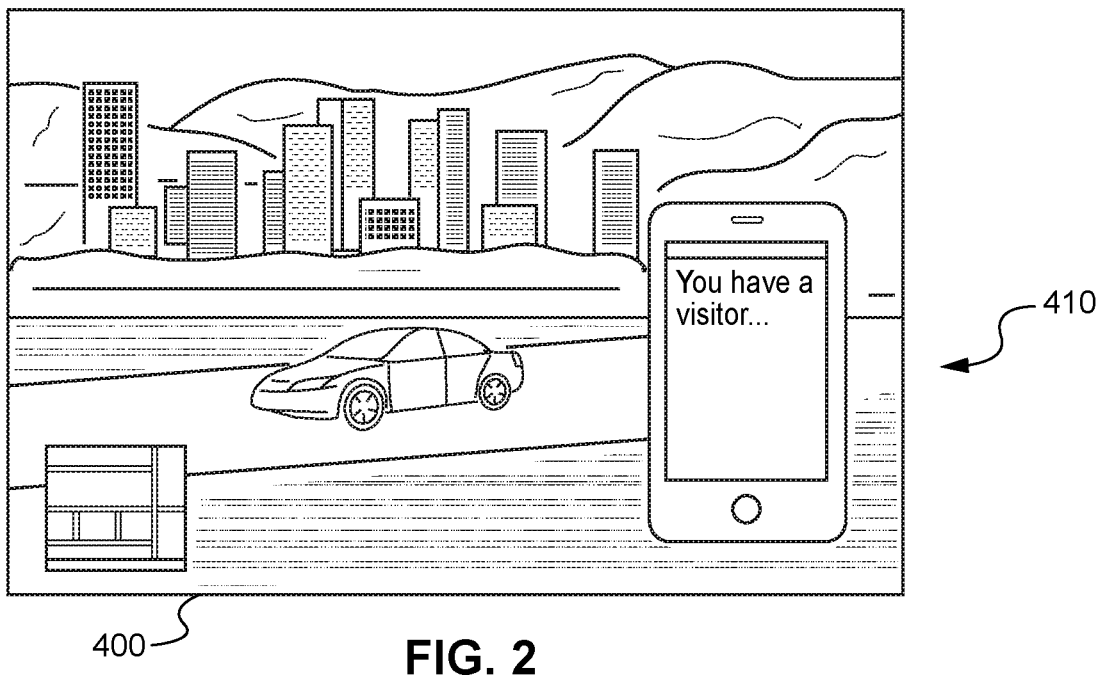
FIG. 2 is an illustration of an example of a visual portion of a virtual reality game including user notification according to an embodiment.

In one aspect, the audio processor 320 and the translator 330 may be configured to provide content to the user in a format that maintains the continuity of the virtual world in which the user is immersed. An example of a scene from a virtual reality game 400 is depicted in FIG. 2. In this example, the user may have selected visual notification and, optionally, audio notification. In the context of the game, the user's virtual reality character is associated with a mobile phone 410 that notifies the user that the doorbell is ringing. Optionally, the mobile phone 410 may ring during the game so that the virtual reality character will answer the phone 410 and see the visual notification that the doorbell is ringing (depicted here as the notification "You have a visitor . . . ").

Figure 3:
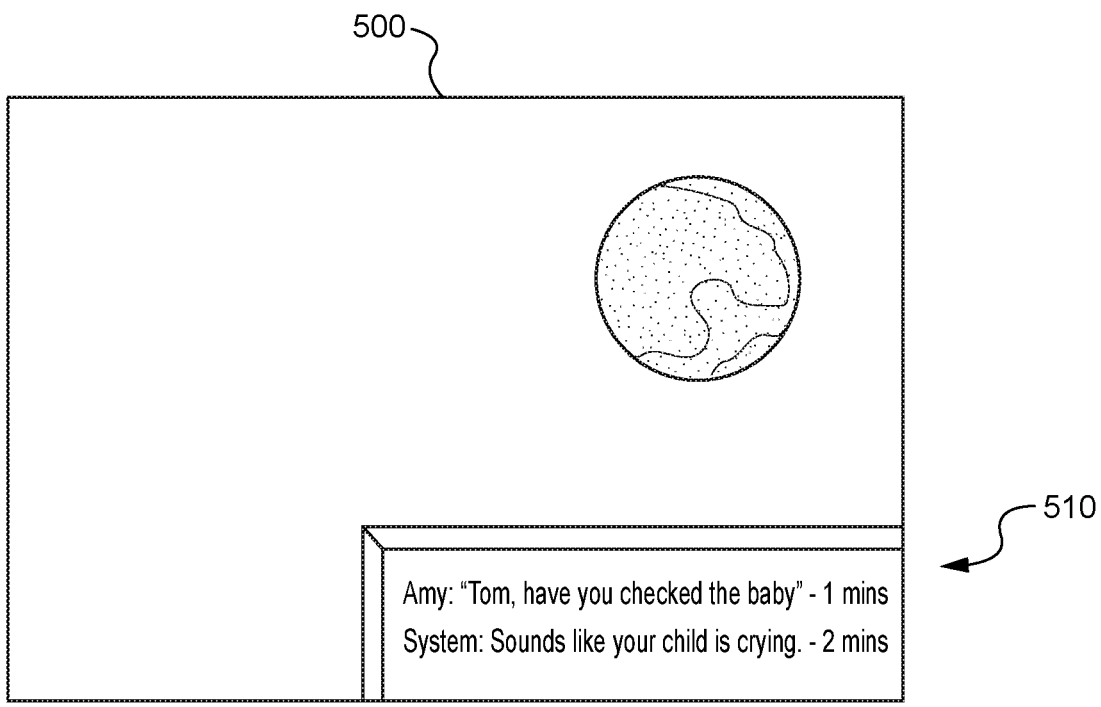
FIG. 3 is an illustration of a further example of a visual portion of a virtual reality game including user notification according to an embodiment.
Figure 4:
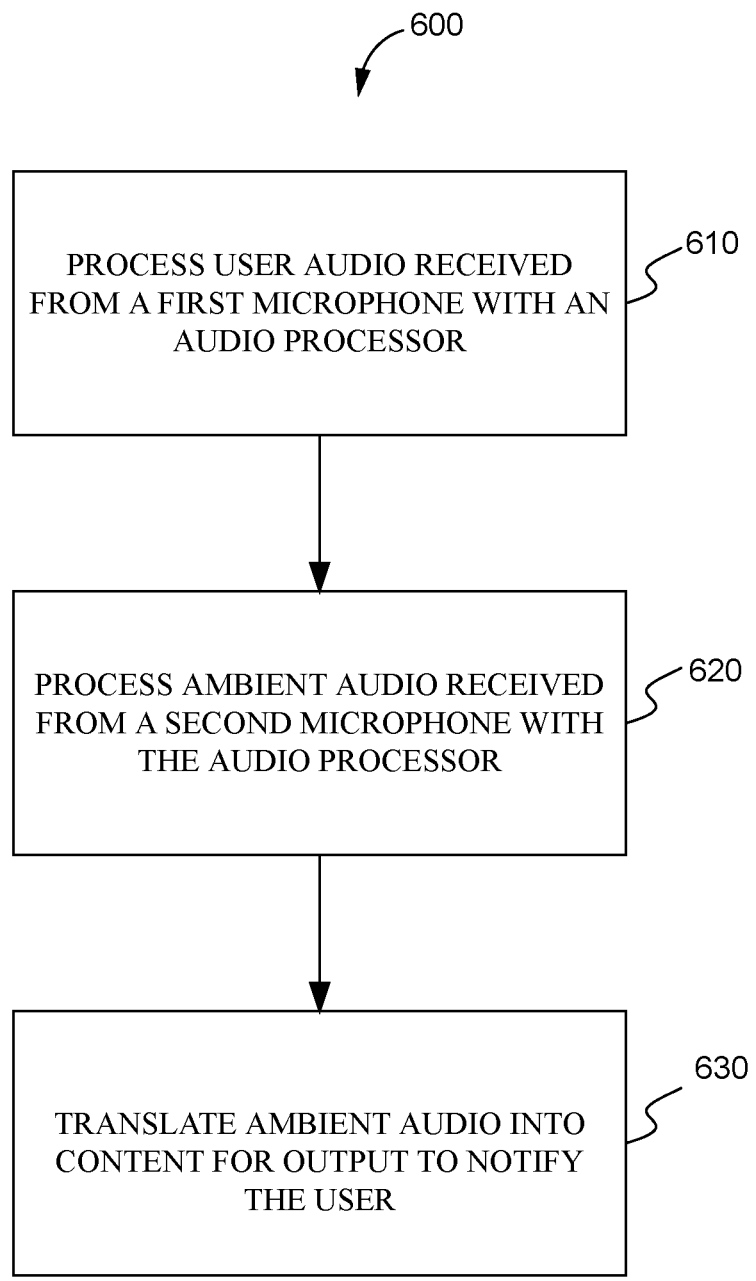
FIG. 4 is a flowchart of an example of a process of notifying a user regarding ambient audio according to an embodiment.

In the example of FIG. 3, a virtual reality game 500 includes a heads-up display 510. The heads-up display 510 may provide text that alerts the user that a child is crying. A later text may display words spoken to the user. Additionally, the virtual reality device 200 may provide haptic feedback, such as a vibration, to further notify the user that something in the surrounding environment demands the user's attention. In both games 400 and 500, the user may have the option of suspending play of the game to deal with something in the physical surroundings. Alternatively, the user may choose to ignore the notifications and continue playing the game.

To accomplish the above game-context notifications, the audio translator 330 (FIG. 1) may consider the current frame being executed by the virtual reality game and superimpose the notification content in an image appearing in that frame or an image that can be contextually brought into that frame.

FIG. 3 shows a method 600 of notifying a user with content derived from ambient audio. The method 600 may generally be implemented in a system such as, for example, the system 100 (FIG. 1), already discussed. More particularly, the method 600 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 600 may be written in any combination of one or more programming languages, including an object oriented programming language such as JAVA, SMALLTALK, C++ or the like and conventional procedural programming languages, such as the "C" programming language or similar programming languages.

Illustrated processing block 610 provides for processing user audio. The user audio may be user voice commands that are received by a first microphone. The first microphone may be a tissue conduction microphone such as, for example, the tissue conduction microphone 220 (FIG. 1) so that a virtual reality game being controlled by voice commands is not confused by ambient sounds or ambient conversations that are not user voice commands. The user audio may be processed by an audio processor that identifies the audio as originating from the user.

Illustrated processing block 620 processes ambient audio received from one or more second microphones such as, for example, the virtual reality device microphone 230 (FIG. 1) and/or the host microphone 310 of FIG. 1). The ambient audio may contain user voice commands that are not intended to be part of the content to notify to the user. Therefore, block 620 may filter out the user audio that originates from the second microphone(s), leaving only the ambient audio.

Illustrated processing block 630 translates ambient audio in a translator such as, for example, the translator 330 (FIG. 1). Visual, and/or audio and/or haptic content may be provided to a user to notify the user of conditions in the surroundings that may need attention.

Additional Notes and Examples

Example 1 may include an environmental immersion system comprising a virtual reality device having a tissue conducting microphone to receive user audio input and a display, a host communicatively coupled with the virtual reality device, the host including an audio processor to receive the user audio input from the tissue conducting microphone and ambient audio from one or more additional microphones, and a translator to translate the ambient audio into content to be output to the virtual reality device.

Example 2 may include the system of example 1, wherein the content is configured to be displayed in a visual element of a virtual reality game.

Example 3 may include the system of examples 1 or 2, wherein the audio processor includes a filter to remove the user audio input from the ambient audio.

Example 4 may include the system of examples 1 or 2, wherein the virtual reality device is a head-mounted device.

Example 5 may include the system of examples 1 or 2, wherein the host is selected from a computer, a tablet, or a gaming console.

Example 6 may include ambient awareness computing apparatus comprising an audio processor to receive user audio input from a tissue conducting microphone and ambient audio from one or more additional microphones, and a translator to translate the ambient audio into content to be output to a virtual reality device.

Example 7 may include the computing apparatus of example 6, wherein the content is configured to be displayed in a visual element of a virtual reality game.

Example 8 may include the computing apparatus of examples 6 or 7, wherein the audio processor includes a filter to remove the user audio input from the ambient audio.

Example 9 may include the computing apparatus of examples 6 or 7, wherein the one or more additional microphones are positioned on a host device that includes the audio processor and the translator.

Example 10 may include the computing apparatus of examples 6 or 7, wherein the one or more additional microphones are positioned on a virtual reality device.

Example 11 may include a method of notifying a user comprising processing user audio received from a first microphone with an audio processor, processing ambient audio received from an additional microphone with the audio processor, and translating ambient audio into output content to notify the user.

Example 12 may include the method of example 11, further comprising outputting the content as visual content to the user.

Example 13 may include the method of example 12, wherein the visual content is configured to be displayed in a visual element of a virtual reality game.

Example 14 may include the method of examples 11 or 13, further comprising filtering to remove the user audio from the ambient audio in the audio processor.

Example 15 may include the method of examples 11 or 13, wherein the first microphone is a tissue conducting microphone.

Example 16 may include the method of example 15, wherein the tissue conducting microphone is positioned in a virtual reality device.

Example 17 may include a computer readable storage medium comprising a set of instructions, which, when executed by a processor, cause a computer to process user audio received from a first microphone with an audio processor, process ambient audio received from a second microphone with the audio processor, and translate ambient audio into output content to notify a user.

Example 18 may include the medium of example 17, wherein, if executed, the instructions cause a computer to output the content as visual content to the user.

Example 19 may include the medium of example 18, wherein the visual content is configured to be displayed in a visual element of a virtual reality game.

Example 20 may include the medium of examples 17 or 18, wherein, if executed, the instructions cause a computer to filter to remove the user audio from the ambient audio in the audio processor.

Example 21 may include the medium of examples 17 or 18, wherein the first microphone is a tissue conducting microphone.

Example 22 may include an apparatus for notifying a user comprising means for processing user audio received from a first microphone with an audio processor, means for processing ambient audio received from an additional microphone with the audio processor, and means for translating ambient audio into output content to notify the user.

Example 23 may include the apparatus of example 22, further comprising means for outputting the content as visual content to the user.

Example 24 may include the apparatus of example 23, wherein the visual content is configured to be displayed in a visual element of a virtual reality game.

Example 25 may include the apparatus of examples 22 or 24, further comprising filtering to remove the user audio from the ambient audio in the audio processor.

Example 26 may include the apparatus of examples 22 or 34, wherein the first microphone is a tissue conducting microphone.

Example 27 may include the apparatus of claim 26, wherein the tissue conducting microphone is positioned in a virtual reality device.

Advantageously, use of the system, apparatus, and methods described above may permit users to remain immersed in a virtual reality world while still being notified of important events occurring in the user's surrounding ambient environment. Use of a tissue conduction microphone may ensure that the virtual reality device will not be confused by sounds in the ambient environment and may only receive user voice commands. Similarly, audio processing may ensure that the user voice is not translated into content to be sent to the virtual reality device.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The terms "coupled" and "communicating" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a virtual reality device having a tissue conduction microphone to receive user audio input and a display;
   a host communicatively coupled with the virtual reality device, the host including:
   an audio processor to receive the user audio input from the tissue conduction microphone and ambient audio from one or more additional microphones; and
   a translator to translate the ambient audio into content to be output to the virtual reality device, wherein the content is configured to be displayed as visual content in a visual element of a virtual reality game, wherein the content is further configured to be displayed to match a format of a virtual world of the virtual reality game in which the user is immersed with a first graphic appearance as text on an electronic communication device within a first type of virtual world and with a second different graphic appearance within a second different type of virtual world.

2. The system of claim 1, wherein the virtual reality device is a head-mounted device.

3. The system of claim 1, wherein the host is selected from a computer, a tablet, or a gaming console.

4. The system of claim 1, wherein the audio processor includes a filter to remove the user audio input from the ambient audio based at least in part on isolation of the user audio input from the tissue conduction microphone.

5. The system of claim 1, wherein the audio processor is recognize distinct sources of ambient sound including one or more of a doorbell sound source, a baby crying sound source, or a pet noise sound source, and wherein the translator is to translate the ambient audio into content to be output to the virtual reality device based on the recognition of the distinct sources of ambient sound.

6. An apparatus comprising:
   an audio processor to receive user audio input from a tissue conduction microphone and ambient audio from one or more additional microphones; and
   a translator to translate the ambient audio into content to be output to a virtual reality device, wherein the content is configured to be displayed as visual content in a visual element of a virtual reality game, wherein the content is further configured to be displayed to match a format of a virtual world of the virtual reality game in which the user is immersed with a first graphic appearance as text on an electronic communication device within a first type of virtual world and with a second different graphic appearance within a second different type of virtual world.

7. The apparatus of claim 6, wherein the one or more additional microphones are positioned on a host device that includes the audio processor and the translator.

8. The apparatus of claim 6, wherein the one or more additional microphones are positioned on a virtual reality device.

9. The apparatus of claim 6, wherein the audio processor includes a filter to remove the user audio input from the ambient audio based at least in part on isolation of the user audio input from the tissue conduction microphone.

10. The apparatus of claim 6, wherein the audio processor is recognize distinct sources of ambient sound including one or more of a doorbell sound source, a baby crying sound source, or a pet noise sound source, and wherein the translator is to translate the ambient audio into content to be output to the virtual reality device based on the recognition of the distinct sources of ambient sound.

11. A method of notifying a user comprising:
processing user audio received from a first microphone with an audio processor;
processing ambient audio received from an additional microphone with the audio processor; and
translating ambient audio into output content to notify the user, wherein the content is configured to be displayed as visual content in a visual element of a virtual reality game, wherein the visual content is further configured to be displayed to match a format of a virtual world of the virtual reality game in which the user is immersed with a first graphic appearance as text on an electronic communication device within a first type of virtual world and with a second different graphic appearance within a second different type of virtual world.

12. The method of claim 11, further comprising outputting the content as visual content to the user.

13. The method of claim 11, wherein the tissue conduction microphone is positioned in a virtual reality device.

14. The method of claim 11, wherein the first microphone is a tissue conduction microphone, the method further comprising: filtering to remove the user audio from the ambient audio in the audio processor based at least in part on isolation of the user audio input from the tissue conduction microphone.

15. The method of claim 11, further comprising:
recognizing distinct sources of ambient sound including one or more of a doorbell sound source, a baby crying sound source, or a pet noise sound source via the audio processor; and
translating ambient audio into output content to notify the user based on the recognition of the distinct sources of ambient sound.

16. A computer readable storage medium comprising a set of instructions, which, when executed by a processor, causes a computer to:
process user audio received from a first microphone with an audio processor;
process ambient audio received from an additional microphone with the audio processor; and
translate ambient audio into output content to notify a user, wherein the content is configured to be displayed as visual content in a visual element of a virtual reality game, wherein the content is further configured to be displayed to match a format of a virtual world of the virtual reality game in which the user is immersed with a first graphic appearance as text on an electronic communication device within a first type of virtual world and with a second different graphic appearance within a second different type of virtual world.

17. The medium of claim 16, wherein, if executed, the instructions cause a computer to output the visual content to the user.

18. The medium of claim 16, wherein the first microphone is a tissue conduction microphone, wherein, if executed, the instructions cause a computer to filter to remove the user audio from the ambient audio in the audio processor based at least in part on isolation of the user audio input from the tissue conduction microphone.

19. The medium of claim 16, wherein, if executed, the instructions cause a computer to:
recognize distinct sources of ambient sound including one or more of a doorbell sound source, a baby crying sound source, or a pet noise sound source via the audio processor; and
translate ambient audio into output content to notify the user based on the recognition of the distinct sources of ambient sound.

\* \* \* \* \*